United States Patent [19]
Annapareddy et al.

[11] Patent Number: 5,603,044
[45] Date of Patent: Feb. 11, 1997

[54] INTERCONNECTION NETWORK FOR A MULTI-NODAL DATA PROCESSING SYSTEM WHICH EXHIBITS INCREMENTAL SCALABILITY

[75] Inventors: Narasimhareddy L. Annapareddy; Damon W. Finney; Michael O. Jenkins; Larry B. Kessler, all of San Jose; Donald J. Lang, Cupertino; Song C. Liang; David N. Mora, both of San Jose; David A. Plomgren, San Carlos; Peter P. Urbisci; Andrew D. Walls, both of San Jose, all of Calif.

[73] Assignee: International Business Machines Corporation, Armonk, N.Y.

[21] Appl. No.: 385,761

[22] Filed: Feb. 8, 1995

[51] Int. Cl.⁶ .................................................. G06F 9/02
[52] U.S. Cl. ............... 395/800; 395/200.03; 361/733; 361/788; 361/803; 439/61; 439/65; 364/228.7; 364/229; 364/231.9; 364/240; 364/242.94
[58] Field of Search .................. 395/800, 200.03; 364/229, 240, 242.94, 231.9, 228.7; 361/733, 788, 803; 439/61, 65

[56] References Cited

U.S. PATENT DOCUMENTS

| | | | |
|---|---|---|---|
| 4,635,192 | 1/1987 | Ceccon et al. | 395/282 |
| 4,670,855 | 6/1987 | Caprio et al. | 395/295 |
| 4,763,329 | 8/1988 | Green | 395/287 |
| 4,777,615 | 10/1988 | Potash | 395/800 |
| 4,805,091 | 2/1989 | Thiel et al. | 395/800 |
| 4,834,483 | 5/1989 | Arthurs et al. | 385/46 |
| 4,967,344 | 10/1990 | Scavezze et al. | 395/182.02 |
| 4,971,563 | 11/1990 | Wells, III | 439/61 |
| 4,975,695 | 12/1990 | Almond et al. | 340/825.79 |
| 5,037,310 | 8/1991 | Marinello | 439/61 |
| 5,113,523 | 5/1992 | Colley et al. | 395/800 |
| 5,122,691 | 6/1992 | Balakrishnan | 326/86 |
| 5,155,785 | 10/1992 | Holland et al. | 385/89 |
| 5,203,004 | 4/1993 | Bunton et al. | 395/800 |
| 5,207,583 | 5/1993 | DeBalko et al. | 439/49 |
| 5,224,100 | 6/1993 | Lee et al. | 370/94.3 |
| 5,243,704 | 9/1993 | Baty et al. | 395/280 |
| 5,245,320 | 9/1993 | Bouton | 345/167 |
| 5,280,607 | 1/1994 | Bruck et al. | 395/575 |
| 5,293,636 | 3/1994 | Bunton et al. | 395/800 |
| 5,308,926 | 5/1994 | Auerbuch et al. | 174/250 |
| 5,321,813 | 6/1994 | McMillen et al. | 395/200 |

FOREIGN PATENT DOCUMENTS

| | | |
|---|---|---|
| 0206580A3 | 6/1986 | European Pat. Off. . |
| 0237193A2 | 2/1987 | European Pat. Off. . |
| 0488057A1 | 11/1991 | European Pat. Off. . |

OTHER PUBLICATIONS

Hewlett–Packard Journal, vol. 43, No. 2, Apr. 1992, Des-Jardin, "VXIbus: A Standard for Test and Measurement System Architecture" (pp. 6–14).

*Primary Examiner*—Thomas C. Lee
*Assistant Examiner*—Anderson I. Chen
*Attorney, Agent, or Firm*— Ohlandt, Greeley, Ruggiero & Perle

[57] ABSTRACT

An interconnection network comprises a pair of backplanes for receiving X pluggable node cards. The pair of backplanes include X backplane connector groups, each backplane connector group adapted to receive mating connectors from a pluggable node card. Each backplane connector group includes X/2 connectors. A first backplane includes first permanent wiring which interconnects a first subset of pairs of connectors between backplane connector groups. A second backplane includes second permanent wiring which interconnects a second subset of pairs of connectors between backplane connector groups. The first permanent wiring and second permanent wiring connect complementary subsets' of pairs of the connectors. A plurality of node cards, each including a card connector group, pluggably mate with the backplane connector groups. Each node card further includes a frontal connector that is adapted to receive a cable interconnection. Each node card includes a processor and a switch module which simultaneously connects the processor to at least plural connectors of a backplane connector group.

8 Claims, 2 Drawing Sheets

PHYSICAL TOPOLOGY

INTERCONNECTION NETWORK FOR A MULTI-NODAL DATA PROCESSING SYSTEM WHICH EXHIBITS INCREMENTAL SCALABILITY

FIELD OF THE INVENTION

This invention relates to an interconnection network for a multiprocessor system and, more particularly, to an interconnection network that enables nodes to be added without requiring disconnection and reconnection of a number of previously connected nodes.

BACKGROUND OF THE INVENTION

Increasingly, computing systems are being configured as multi-nodal structures wherein individual nodes each include a microprocessor for operating upon a subset of an overall data processing action. Interconnection of such nodes is preferably configured in the form of hard-wired backplanes. Such backplane networks provide highly reliable interconnectivity and maintain interconnection costs at a minimum. However, when all nodal intercommunication wiring is of fixed form, the nodal structure becomes fixed, making system changes difficult and expensive to implement. At the other extreme, nodes may be interconnected by pluggable cabling which renders nodal system changes easily implemented, but significantly raises the cost of nodal interconnections.

It is vital that a multi-nodal system retain an ability to accommodate a change to its nodal configuration without requiring substantial modifications to supporting system components. For instance, a customer may purchase a multi-nodal system exhibiting a first configuration, and over a period of time require additions to the nodal configuration to accommodate added data processing requirements. Such additional nodes should be able to be added to the multi-nodal system while the system is in operation and without requiring significant structural change to the system. The prior art is replete with various interconnection networks for computing systems. U.S. Pat. No. 5,122,691 to Balakrishnan describes an interconnection architecture for a backplane in a computer system. The backplane provides a physical interconnection between a plurality of pluggable modules. Each backplane includes an interconnect chip which provides point-to-point links between the modules and the interconnection topology on the backplane. U.S. Pat. No. 5,243,704 to Baty et al. describes an interconnect system for a multi-nodal system wherein individual nodes are connected to one another over a plurality of bus lines that provide independent communication pathways. The buses are configured in a sparse array so that every node can communicate directly with every other node over a dedicated independent connection pathway and so that no one bus connects together all of the nodes. U.S. Pat. No. 4,967,344 to Scavezze et al. describes a multi-nodal system which is constructed to allow individual node cards to be plugged into a backplane (see FIG. 16). Special purpose cable circuit cards are also pluggable into the backplane and enable non-backplane cable interconnections to be made to other node/backplane assemblies.

U.S. Pat. No. 5,207,583 to DeBalko et al. describes a network interface unit wherein a plurality of circuit cards each include a male and female connector. Each circuit card is inserted into a housing so that the female connectors plug into a motherboard. The male connectors enable external wired connections to be made to the circuit cards.

U.S. Pat. No. 4,971,563 to Wells, III discloses a modular backplane assembly that comprises at least two interchangeable modular backplanes that allow at least two different predetermined types of electrical interconnection hardware and mechanical mountings. U.S. Pat. No. 4,975,695 to Almond et al. discloses a communication node for connection of multiple network processors and multiple packet processors. Each switch matrix has multiple I/O ports with bidirectional data links. The switch matrices are connected to each other by a backplane bus or via bidirectional data links.

U.S. Pat. Nos. 5,203,004 and 5,293,636 to Bunton et al. each disclose a multi-board computer system wherein each set of boards has an associated plug-in connector that enables a separate power supply for each set of boards.

U.S. Pat. No. 5,280,607 to Bruck et al. discloses the addition of spare components (nodes) and extra links to a given target mesh for a fault-tolerant n-dimensional mesh architecture. When a faulty node is detected, the mesh is reconfigured without use of switches.

It is an object of this invention to provide an improved interconnection network for a multi-nodal computing system.

It is another object of this invention to provide an improved interconnection network for a multi-nodal system wherein nodes may be added or removed while the remainder of the nodes remain operational.

It is a further object of this invention to provide an interconnection network where at least a portion of a backplane can be removed without requiring the system be rendered nonoperational.

SUMMARY OF THE INVENTION

An interconnection network comprises a pair of backplanes for receiving X pluggable node cards. The pair of backplanes include X backplane connector groups, each backplane connector group adapted to receive mating connectors from a pluggable node card. Each backplane connector group includes X/2 connectors. A first backplane includes first permanent wiring which interconnects a first subset of pairs of connectors between backplane connector groups. A second backplane includes second permanent wiring which interconnects a second subset of pairs of connectors between backplane connector groups. The first permanent wiring and second permanent wiring connect complementary subsets of pairs of the connectors. A plurality of node cards, each including a card connector group, pluggably mate with the backplane connector groups. Each node card further includes a frontal connector that is adapted to receive a cable interconnection. Each node card includes a processor and a switch module which simultaneously connects the processor to at least plural connectors of a backplane connector group.

DETAILED DESCRIPTION OF THE INVENTION

The interconnection network to be hereafter described prewires a number of plug-connected nodes via permanent backplane wiring. Each backplane includes multiple pluggable node connectors for receiving node cards. Provision is made for interconnection of the node connectors via pluggable cabling which both enables node intercommunication and, further, enables interconnection between plural pairs of backplanes. Each node card is provided with a frontal connector module which enables front-end interconnection to another node card.

The network interconnection hierarchy to be described below comprises a plurality of node cards including processing elements. Each node card is provided with L full-duplex ports, each port configured as a connector module. Each connector module can connect to other nodes and for connectivity purposes all nodes are considered identical. Nodes are clustered in a "cage" comprising a pair of backplanes, with each cage holding up to X (e.g. 8) nodes. A node may be added or removed to or from a cage without requiring other nodes to be taken out of service. The number of cages can be expanded indefinitely, but all cages must be populated by a minimum number of nodes before another cage is added to the network.

Interconnects (or links) between connector modules are implemented as either permanent wiring or as movable cables. Those cables which are moved only when a cage is added to the network are hereafter referred to as cage cables. Such cables interconnect connector modules from the reverse side of the backplanes. Cables which may be moved when a node is added to a cage will hereafter be referred to as jumper cables and are preferably only connected to the frontal connector module present on each node card.

Figure 1:
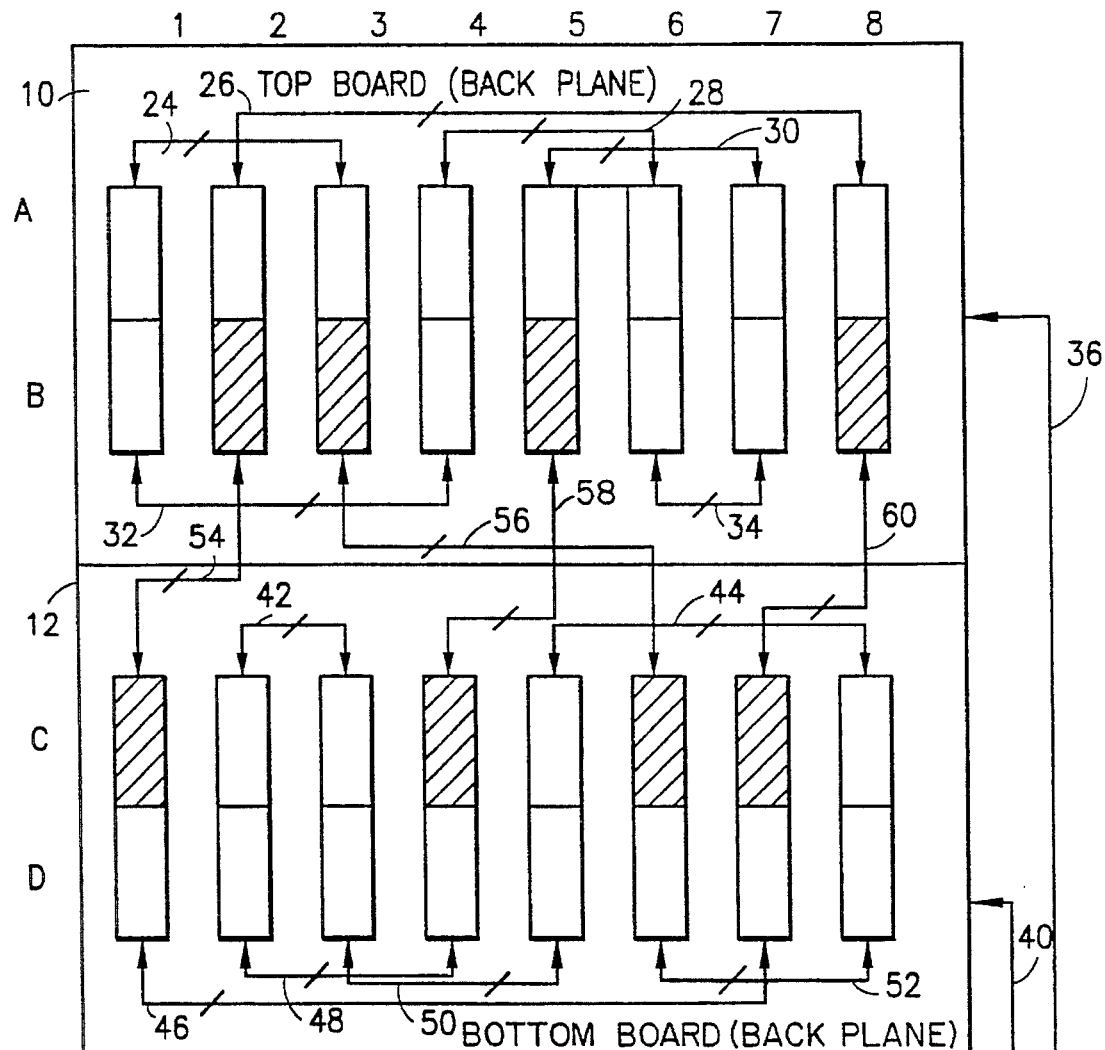
FIG. 1 is a schematic showing of a pair of backplanes, each backplane including permanent wiring which interconnects two of four integral connectors that comprise a portion of a single backplane connector group (there being eight backplane connector groups shown).
Figure 2:
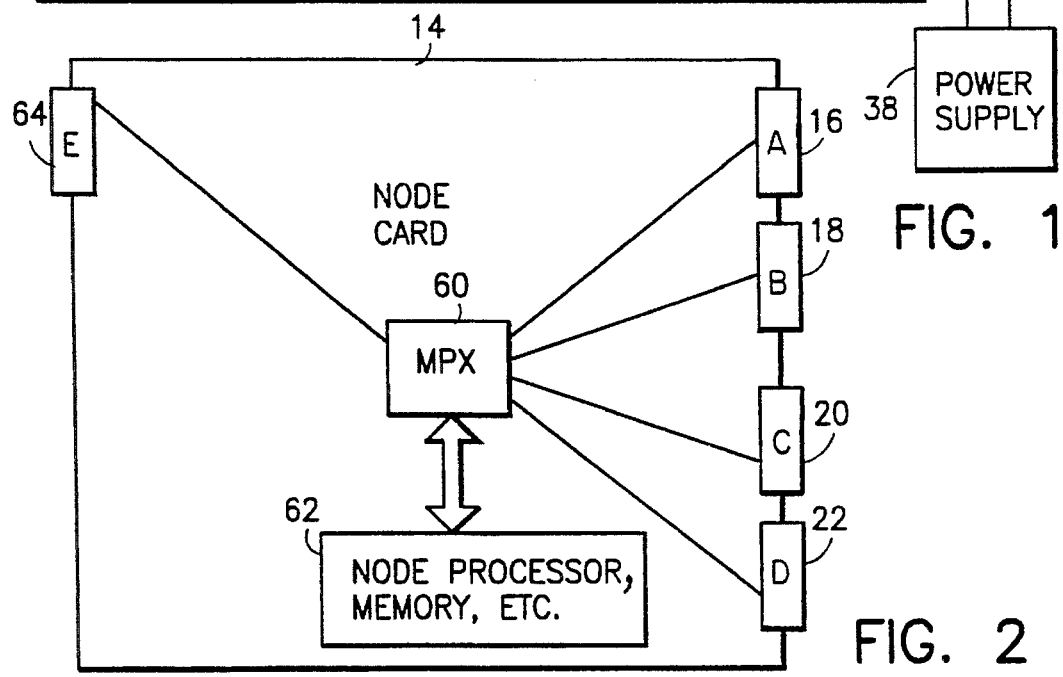
FIG. 2 is a side view of a node card adapted to mate with a backplane connector group in FIG. 1.

Referring now to FIG. 1, a cage comprises a pair of backplanes 10 and 12 which are electrically independent, but which provide permanent, internally-configured, wiring harnesses between selected connector modules. Each backplane is populated with eight pairs of connector modules. Thus, backplane 10 includes connector modules A1–A8 and B1–B8. Each of the aforesaid connector modules is adapted to receive a mating connector module from a node card 14 (see FIG. 2). Each of connector modules 16 and 18 on each node card 14 is adapted to mate with a pair of adjoining A and B connector modules on backplane 10.

In similar fashion, backplane 12 includes eight pairs of connector modules C1–C8 and D1–D8. Connector modules 20 and 22 on node card 14 (FIG. 2) are adapted to mate with a pair of adjoining connector modules on backplane 12. Connector modules A1, B1, C1 and D1 together comprise a backplane connector group and respectively mate with connector modules 16, 18, 20 and 22 on a node card 14. The connector modules on backplanes 10 and 12 may be either female or male connectors, with the connector modules on node card 14 being of the opposite sense. It is to be understood that while it is preferred to have two connector modules per node card on each backplane, a single connector module configuration per back backplane may also be employed.

Backplanes 10 and 12 include internal, permanent wiring harnesses between selected ones of the connector modules present thereon. Each wiring harness is shown as a single line with a slash through it to indicate that it comprises multiple conductors. Similarly, each connector module is shown as a rectangle, but it is to be understood that there are multiple electrical interconnection structures present therein. Each crosshatched connector module is one which, in addition to being adapted to receive a mating connector module from a node card 14, is also adapted to receive, on the rear side of backplane 10 (or backplane 12), a cable interconnection.

Backplane 10 thus includes a permanent wiring harness 24 between connector modules A1–A3; a permanent wiring harness 26 between connector modules A2 and A8; a permanent wiring harness 28 between connector modules A4 and A6; a permanent connector wiring harness 30 between connector modules A5 and A7; a permanent connector wiring harness 32 between connector modules B1 and B4; and a permanent wiring harness 34 between connector modules B6 and B7. Each of connector modules B2, B3, B5 and B8 are adapted not only to receive frontal connections from a node card 14 but also rear connections from cage cables.

Backplane 10 includes internal power distribution wiring which receives energization via line 36 from power supply 38. Backplane 12 also includes internal power distribution wiring to its connector modules and receives its power via conductor 40 from power supply 38. Other than cage cables which interconnect the rear interfaces of the respectively cross-hatched connector modules, backplane 10 and backplane 12 are electrically independent.

Backplane 12 includes the following permanent wiring harnesses between connector modules: wiring harness 42 between connector modules C2 and C3; wiring harness 44 between connector modules C5 and C8; wiring harness 46 between connector modules D1 and D7; wiring harness 48 between connector modules D2 and D4; wiring harness 50 between connector modules D3 and D5; and wiring harness 53 between connector modules D6 and D8. Connector modules C1, C4, C6 and C7 are shaded and are adapted to receive, on their rear aspects, cage cable interconnections.

The permanent wiring harnesses in backplane 10 connect complementary pairs of connector modules to those that are connected by permanent wiring harnesses in backplane 12.

As can be seen from the above described interconnection structure comprising backplanes 10 and 12, each of the eight backplane connector groups is adapted to receive a node card 14 in plug-in fashion. When backplanes 10 and 12 are fully populated with node cards, cage cables 54, 56, 58 and 60 provide interconnections between the respectively shown connector modules on backplanes 10 and 12. As will be seen from the description below, the interconnection network shown in FIG. 1 enables a torus-like structure to be created between the node cards which populate backplanes 10 and 12.

As described above, backplanes 10 and 12 together comprise a cage. Individual cages are interconnectable via connections made by one or more of cage cables 54, 56, 58 or 60—after being disconnected from the format as shown in FIG. 1.

Returning to FIG. 2, each node card 14 further includes a multiplexer switch 60 which enables interconnection between the node's processor 62, etc. and any one or more of connectors 16, 18, 20 and 22. On the front edge of node card 14, frontal connector module 64 enables jumper cables to be connected between respective node cards for further interconnections.

As will become hereafter apparent, a cage comprising backplanes 10 and 12 may be populated by from 1 to 8 node cards. It is important that nodes be able to be added or subtracted from a cage without requiring disconnection of other nodes or rendering of the computing system inoperative when the new node card is being inserted or an old node card is being extracted. Accordingly, as nodes are added to the cage, jumper cables are used to connect certain adjacent nodes between additional connector modules 64. In table 1 below, the double asterisks () indicate the presence of jumper cables between frontal connector modules in adjacent nodes. For example, for a cage with 5 nodes, a first jumper cable connects frontal connector modules 64 in nodes 1 and 2 and a second jumper cable connects frontal connector modules 64 in nodes 4 and 5**.

Figure 3:
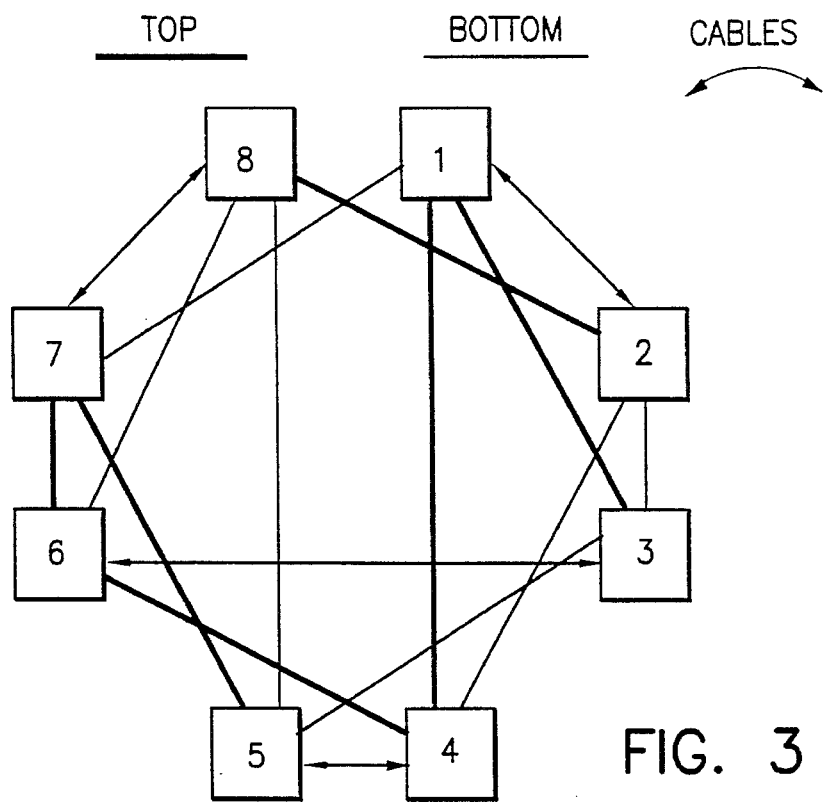
FIG. 3 is a block diagram showing nodal interconnections when node cards are mated with all backplane connector groups in FIG. 1.
Figure 4:
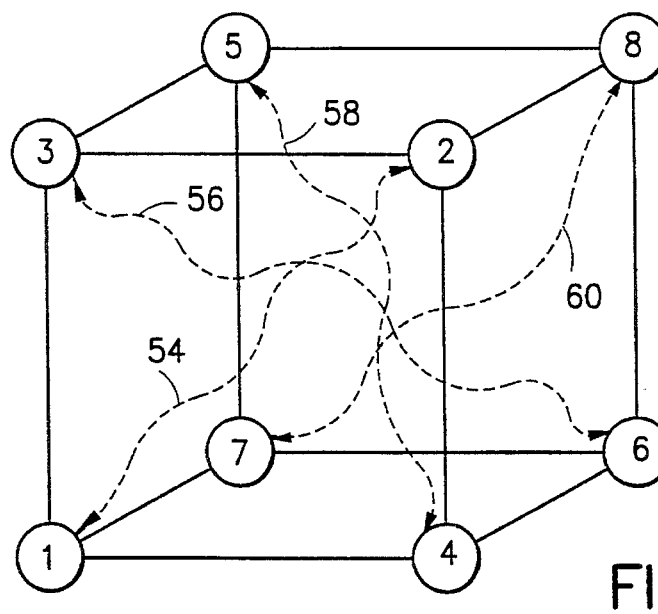
FIG. 4 is a further showing of the interconnection network of FIG. 3, illustrating that nodes 1–8 are connected in a hypercube configuration.

FIGS. 3 and 4. The heavy connecting lines indicate the fixed permanent wiring provided by top backplane 10 and the thinner connecting lines represent permanent wiring provided by bottom backplane 12. Cage cables are indicated by heavy lines with arrows at their terminations. Note that each node has four simultaneously operable duplex communication channels connecting it to four other nodes. No jumper cables are required for this configuration. In FIG. 4, nodes 1–8 have been arranged to indicate their hypercube-form structure, showing cage cables 54, 56, 58 and 60 which interconnect backplanes 10 and 12.

As more cages are added to the network, the four links enabled by cage cables 54, 56, 58 and 60 are disconnected and used to establish links to other cages. The four connector modules B2, B3, B5 and B8 are called, for example, the G1 group and the four connector modules C1, C4, C6 and C7 are termed the G2 group. Between the cages, connections between these groups are produced as follows:

TABLE 1

| # of nodes in cage | # of connections/node | | | | | | | fixed wiring links | cage cable links | jumper links | total links |
|---|---|---|---|---|---|---|---|---|---|---|---|
| | 1 | 2 | 3 | 4 | 5 | 6 | 7 | 8 | | | |
| 2 | 2**2 | | | | | | | | 0 + | 0 + | 1 = | 2 |
| 3 | 3**3 | 2 | | | | | | | 2 | 1 | 1 | 4 |
| 4 | 44 | 33 | | | | | | | 4 | 1 | 2 | 7 |
| 5 | 44 | 3 | 43 | | | | | | 5 | 2 | 2 | 9 |
| 6 | 44 | 4 | 4 | 33 | | | | | 6 | 3 | 2 | 11 |
| 7 | 4 | 3 | 4 | 4 | 4**4 | 3 | | | 9 | 3 | 1 | 13 |
| 8 | 4 | 4 | 4 | 4 | 4 | 4 | 4 | 4 | 12 | 4 | 0 | 16 |

In Table 1 above, the left hand column indicates the number of nodes populating a cage. The second column indicates the number of simultaneous duplex connections between adjacent nodes and indicates where at least one of those connections is provided by a jumper cable. Thus, for a cage populated by two nodes, multiplexer switches 60 in two adjacent nodes assure that at least two connector modules on each node card are simultaneously enabled to provide communications. One of those connector modules is a frontal connector module 64 that is coupled to an adjacent node card's frontal connector module 64 via a jumper cable.

Note that for any cage populated by more than 3 nodes, there are invariably three or more simultaneously available duplex communication channels through the respectively indicated connector modules. For every cage configuration that is not fully populated, at least one jumper cable is required (but never more than two). In addition, for a fully populated cage, each of node cards 14 has 4 simultaneously operational duplex communication channels through connector modules 16, 18, 20 and 22 and no jumper cables are required. Note further that the number of fixed wiring links is substantially greater than any required cable links, thereby maintaining a relatively low cost interconnection network.

If it is assumed that a cage comprising backplanes 10 and 12 is fully populated with node cards 14, the physical topology of the circuit interconnection appears as shown in

| symbol . . . | . . . implies cable connections . . . |
|---|---|
| G1 = G1: | B2—B2, B3—B3, B5—B5, B8—B8 |
| G2 = G2: | C1—C1, C4—C4, C6—C6, C7—C7 |
| G1 = G2: | B2–C1, B3–C4, B5–C6, B8–C7 |
| G2 = G1: | C1–B2, C4–B3, C6–B5, C7–B8 |

Following that naming convention, the inter-cage cabling scheme for 2-cage to 4-cage configurations is then:

| two-cage | | three-cage | | | four-cage | | | |
|---|---|---|---|---|---|---|---|---|
| cage 0 | cage 1 | cage 0 | cage 1 | cage 2 | cage 0 | cage 1 | cage 2 | cage 3 |
| G1 = G1 | | G1 = G1 | | | G1 = G1 | | G1 = G1 | |
| G2 = G2 | | G2 ======= G2 | | | G2 ======= G2 | | G2 | |
| | | | G2 = G1 | | | G2 ========= G2 | |

The extension of the above described interconnection network to a number of cages is straightforward. The general rule for adding the (n+1)st cage, for n>2, is to (i) disconnect the four cable group connecting cages n and n−1, (ii) connecting the resulting open group of connectors in cage n−1 to the identical connector group in cage n+1 and (iii) connecting the remaining open connector group in cage n to the remaining open connector group in cage n+1. If the cages are physically added in a line, then a feature of this network implementation is that the maximum length cable must span only two cage widths. Also, for adding or deleting a cage, cable movements are limited to the last three cages in the line.

The separation of backplanes in a cage into two separate backplanes 10 and 12 enables one such backplane to be removed while the system remains operational, although in a degraded mode. System performance can be enhanced during a service action by adding frontal connections (when one backplane is removed). Each backplane provides a voltage distribution connection to the nodes via the resident connector modules. Thus, if one backplane fails, the system remains powered by the power distribution network on the adjoining backplane. Replacement of a backplane can be concurrent with functional operation of the system, since all nodes remain powered up even though one backplane has been removed. Half of the interconnects become non-operational as a result of the removal of the backplane. By enabling each node to plug into both backplanes via two connector modules, redundancy is achieved in both communications capability and powering capability.

The invention allows node cards to be added with a minimum of cable movements, e.g. if a 5th node is added to a 4 node system the node card is slid into the cage and then one end of the jumper between the 3rd and 4th nodes is moved to the 5th node. The most movement that is required is the removal of a jumper. Going from 2 to 3 nodes requires no movement. Deleting nodes is similar.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An interconnection network comprising:

backplane means for receiving X pluggable node cards, and comprising X backplane connector groups, each backplane connector group adapted to receive mating connectors from a pluggable node card and including X/2 connectors, said backplane means including first permanent wiring which provides a first set of interconnections between a first subset of pairs of connectors in said backplane connector groups and second permanent wiring which provides a second set of interconnections between a second subset of pairs of connectors in said backplane connector groups, each pair of connectors comprising a connector in one backplane connector group and a connector in another backplane connector group, said first set of interconnections and second set of interconnections interconnecting complementary pairs of said connectors;

a plurality of node cards, each including a card connector group for pluggably mating with a backplane connector group, each node card further including at least an additional connector adapted to receive a cable interconnection;

processor means positioned on each node card;

switch means on each node card for simultaneously connecting said processor means to at least two or more connectors of a card connector group.

2. The interconnection network as recited in claim 1, wherein $X=2^N$ and when at least N node cards are pluggably mated to said backplane means, said switch means on each said at least N node cards are controlled to enable communications through at least N connectors in each backplane connector group.

3. The interconnection network as recited in claim 2, wherein when from 2 to X–1 node cards are pluggably mated to said backplane means, switch means on at least two said node cards enable communications through said additional connector on each said two node cards.

4. The interconnection network as recited in claim 2, wherein when X node cards are pluggably mated to said backplane means, said switch means on said X node cards enable communications only through connectors pluggably mated to said backplane means.

5. The interconnection network as recited in claim 1, wherein said backplane means comprises:

a first backplane including one half of the connectors in each said connector group and further including said first permanent wiring, and wherein said one half of the connectors on said first backplane include said first subset of connectors; and a second backplane including a second half of the connectors in each said connector group and further including said second permanent wiring, and wherein said second half of the connectors on said second backplane include said second subset of connectors.

6. The interconnection network as recited in claim 5, wherein said first permanent wiring includes first power circuits connected to each said first subset of connectors and said second permanent wiring includes second power circuits connected to each said second subset of connectors, said first power circuits and second power circuits independent of each other to enable continued power delivery to a node card in the event of disablement of said first or second backplane.

7. The interconnection network as recited in claim 6, wherein X=8 and each backplane connector group includes four pluggable connectors, two said connectors mounted on said first backplane and two said connectors mounted on said backplane.

8. The interconnection network as recited in claim 7, further comprising:

rear connector means positioned on a rear surface of each said first backplane and said second backplane and in registration with each connector that is not connected to another connector via said permanent wiring, said rear connector means enabling interconnection of said connectors via external cable wiring.

\* \* \* \* \*